United States Patent
Whitehead et al.

(10) Patent No.: US 8,568,912 B2
(45) Date of Patent: Oct. 29, 2013

(54) REDOX FLOW BATTERY

(75) Inventors: Adam Whitehead, Eisenstadt (AT); Martin Harrer, Vienna (AT)

(73) Assignee: Cellstrom GmbH, Eisenstadt (AT)

( * ) Notice: Subject to any disclaimer, the term of this patent is extended or adjusted under 35 U.S.C. 154(b) by 580 days.

(21) Appl. No.: 12/452,431

(22) PCT Filed: Jun. 9, 2008

(86) PCT No.: PCT/EP2008/057145
§ 371 (c)(1),
(2), (4) Date: Mar. 18, 2010

(87) PCT Pub. No.: WO2009/003795
PCT Pub. Date: Jan. 8, 2009

(65) Prior Publication Data
US 2010/0178533 A1 Jul. 15, 2010

(30) Foreign Application Priority Data
Jul. 2, 2007 (AT) .................. A1016/2007

(51) Int. Cl.
*H01M 8/18* (2006.01)
*H01M 8/20* (2006.01)
*H02J 7/00* (2006.01)

(52) U.S. Cl.
USPC .............. 429/105; 429/50; 429/149; 320/103

(58) Field of Classification Search
None
See application file for complete search history.

(56) References Cited

U.S. PATENT DOCUMENTS

| 4,797,566 | A | 1/1989 | Nozaki et al. | |
| 7,939,190 | B2 * | 5/2011 | Colello et al. | 429/61 |
| 2005/0074665 | A1 | 4/2005 | Spaziante et al. | |
| 2007/0190369 | A1 * | 8/2007 | Leach et al. | 429/9 |

FOREIGN PATENT DOCUMENTS

| JP | 61218076 | 9/1986 |
| JP | 2003086228 | 3/2003 |
| JP | 2006313691 | 11/2006 |

OTHER PUBLICATIONS

English Abstract of JP 2003086228, Mar. 2003.
English Abstract of JP 2006313691, Nov. 2006.
English Abstract of JP 61218076, Sep. 1986.

* cited by examiner

*Primary Examiner* — Jonathan Crepeau
(74) *Attorney, Agent, or Firm* — Dykema Gossett PLLC

(57) ABSTRACT

A redox flow battery, in particular a vanadium redox flow battery, with at least two functional units, for example at least two stages with at least one battery cascade, or at least two battery cascades, has a device for electrically decoupling at least one of these units. In order to ensure fault-free and functionally reliable operation of an energy supply system on the basis of such a redox flow battery alongside best-possible efficiency, a device for connecting a decoupled functional unit to at least one store for electrical energy is provided.

5 Claims, 1 Drawing Sheet

REDOX FLOW BATTERY

BACKGROUND OF THE INVENTION

1. Field of the Invention

The invention relates to a redox flow battery, in particular a vanadium redox flow battery, comprising at least two functional units, for example, at least two stages with at least one battery string, or at least two battery strings, wherein at least one unit is provided with a device for electrical decoupling, and a method to operate such a redox flow battery, whereby the not-needed functional units of which are deactivated.

2. The Prior Art

For redox flow batteries, the self-discharge in a stack is relatively high because of transport phenomena and shunt currents. To reduce self-discharge and hence to increase efficiency, multi-stage systems were implemented. Here, stacks which are not needed are "shut-down", i.e., there is no electrolyte flow, and they are electrically decoupled. After stopping the flow, the charge remaining in the stack is transformed into heat due to self-discharge. Here, not only the energy loss is a problem, but also the temperature increase of the electrolyte.

JP 2003086228 A1 describes that also in case of stacks arranged above the tanks, and despite the stop of pumping the electrolyte, the whole amount of electrolyte does not flow out of the stacks. The part of electrolyte remaining in the stacks, whether in a charged or partially charged state, would self-discharge while generating heat. To solve this problem it is proposed to discharge the stacks with rest electrolyte into an external circuit by means of an inverter; however, for this a substantially constant load is required. Then, the tanks could also be arranged below the electrolyte in the stacks so that the pumping power can be reduced. During charging of the stacks, the circulation of the electrolyte does not start before the charge level of the electrolyte in the stack has reached the one of the electrolyte in the tank. However, a sub-stack remains always actively supplied with electrolyte, even when the flow in other stacks is stopped, to be able to cover an immediate electricity demand. Since it takes several minutes to fill a discharged stack, a rapidly increasing demand can not be covered in such a manner, or only with a plurality of stacks which are kept active.

A selective discharge of stacks without a flow for avoiding self-discharge resulting in heat generation is also disclosed in JP 2006313691 A1. Here, while the flow is stopped, an idle load strictly for the reduction of the electrical energy is electrically coupled to avoid an excessive temperature increase, however, without focusing on the effectiveness of the arrangement.

According to JP 61218076 B, a lead-acid battery in parallel to a flow battery is proposed to provide a buffer for short-term variations of the electricity demands while the flow battery takes over the long-term supply. U.S. Pat. No. 4,797,566 B describes in a similar manner that the flow batteries provide an "equalization" voltage for the lead-acid battery and also additional storage capacity for the whole system. It is also described that the flow battery—or a stack thereof—can be used as end cell for the lead-acid battery, i.e. arranged in series.

Thus, it was the object of the present invention to propose a system that ensures a fault-free and functionally reliable operation of an energy supply system on the basis of a redox flow battery while achieving the best possible efficiency.

SUMMARY OF THE INVENTION

To solve this object, the above described battery is characterized according to the invention in that a device for connecting a decoupled functional unit to at least one storage for electrical energy is provided. Thus, deactivated stacks, battery strings with multiple stacks, or complete stages of multi-stage systems can be selectively discharged. By means of a DC/DC converter, this energy can be used to charge a parallel battery or subsystems of the flow battery which are still active. Thereby, the self-discharge for a dynamic consumer or charging profile can be minimized and the danger of irreversible fallout in the cell can be reduced considerably. For this, the energy does not have to be consumed by an external circuit which is connected by means of an inverter, but can be stored in the flow battery itself or in additional energy storages for output in case of a given, rapidly and strongly fluctuating demand. The rapidly needed energy can be provided immediately and independent from the time necessary for recharging the shut-down parts of the flow battery. The energy which is not needed temporarily is not consumed by a resistance load as it is the case in conventional systems, but is provided with increased energy efficiency of the complete system when required by the grid.

According to a first embodiment of the invention, a complete stage can be connected with at least one storage.

Of course, a battery string can also be connected with at least one storage, if needed within one stage.

A plurality of battery strings of the same stage are advantageously provided with units which are separate, but are switching in the same direction.

An advantageous embodiment of a redox flow battery according to the invention is characterized in that a still active functional unit is used as storage.

In contrast, another embodiment provides that accumulators and/or super-capacitors are used as storage, if necessary in combination with a still active functional unit. Ultra-capacitors, super-capacitors, or batteries are safe and approved means for bridging a short-term energy demand, or during switching from a long-term energy supply to another one (e.g. from supply by the electricity grid to a diesel generator).

The use of lead-acid batteries for storing the energy which is released during the discharge of stacks of the flow battery could cover the electricity demand until shut-down stacks are provided again with fresh electrolyte and are able to supply electricity. Typically, this takes one to several minutes. Here, the self-discharge of lead batteries is approx. 0.3 to 0.4% of the self-discharge of vanadium redox flow battery stacks.

Advantageously, it is provided that the device comprises a DC/DC converter.

For switching from the active operation to the connection with the at least one storage, according to another embodiment of the invention, a relay can be provided.

On the part of the method described at the beginning, for solving the given object it is provided according to the invention that shut-down functional units are connected with at least one storage for electrical energy, and that this storage is charged by the shut-down units.

Advantageously, upon shut-down of a functional unit, a connection is established automatically with at least one storage, preferably by means of a programmable controller (SPS).

According to an advantageous embodiment of the method according to the invention, it is provided that the storage, at least during an instantaneous energy demand exceeding the capacity of the redox flow battery, is automatically connected with the load.

Alternatively, it can also be provided that a connection of the storage with the load is permanently maintained by means of a diode.

In the following description, the invention is to be illustrated in more detail by means of the attached drawings.

DETAILED DESCRIPTION OF THE PREFERRED EMBODIMENT

Figure 1:
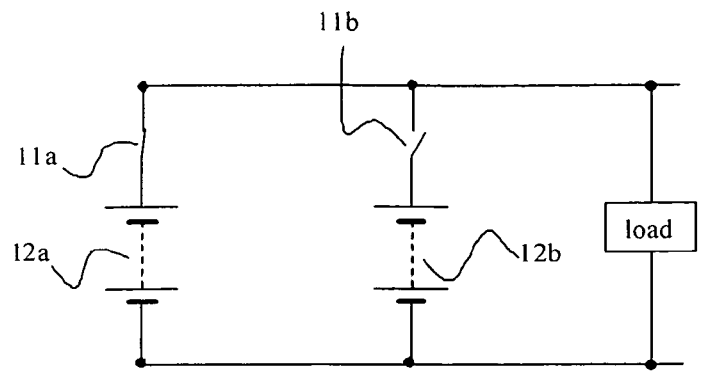
FIG. 1 shows an electrical diagram of a conventional redox flow battery with an active and an inactive battery string.

FIG. 1 shows a flow battery, for example a vanadium redox flow battery with two battery strings 12a and 12b. In the illustrated example, each of these strings consists of two stacks. Principally, the present invention can be used as soon as at least two parallel functional units are available, for example, at least two parallel stacks, at least two parallel battery strings from a plurality of stacks, or at least two stages, each of them again consisting of at least two battery strings or stacks. Each battery string 12a or 12b can be decoupled from the load by means of a switching device 11a and 11b, respectively, as it is shown for the battery string 12b by the open switch 11b. Each of the not-needed stacks is preferably "shut down", i.e., the electrolyte does not flow through any more. Preferably, the switching devices can be realized by relays.

Figure 2:
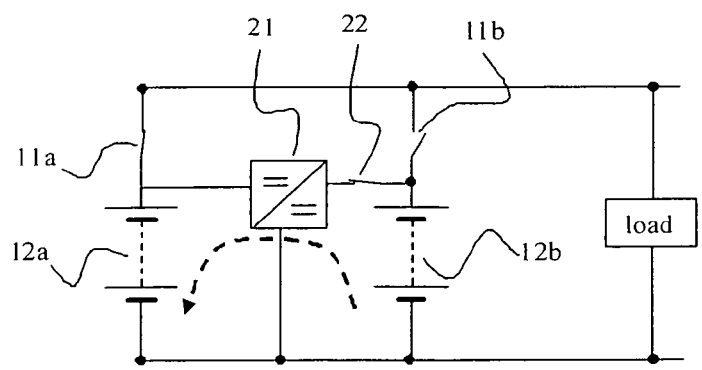
FIG. 2 is a similar illustration of a battery according to the invention, also with an active and an inactive battery string.

At least one of the parallel functional units, in the example of FIG. 2 it is battery strings 12b, is now provided with a device 21, 22 for connecting this functional unit with the parallel battery string 12a which, in this case, acts as storage for electrical energy from the battery string 12b. The occasional connection of the two parallel functional units 12a and 12b of the flow battery of FIG. 2 takes place by means of DC/DC converter 21 and a switch or a relay 22. At shutdown of a functional unit, the connection is established advantageously automatically, preferably by means of a PLC.

Figure 3:
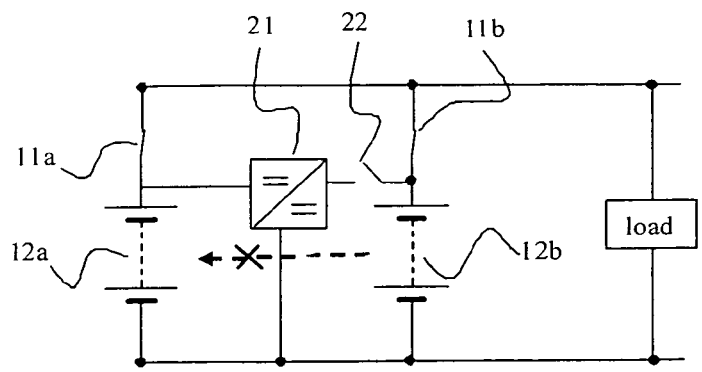
FIG. 3 is the battery of FIG. 2 with both batteries being active.

If the demand for electrical energy increases again, first the yet-inactive battery string 12b is filled with charged fresh electrolyte and, upon an appropriately high voltage level, is coupled again to the load by opening the switch 22 and closing the switch 11b, as schematically illustrated in FIG. 3.

To limit the current strength for the switching devices 11a, 11b, or 22, respectively, for functional units which are to switch in the same direction, the switching devices can be allocated to their sub-units. Typically, the current strengths of battery strings of vanadium redox flow batteries are in the range of 50 to 500 A while the voltage is between approximately 20 and 200 V. For example, to connect a complete stage of a multi-stage system to a storage for electrical energy, a switching device for each battery string of this stage is provided, and all switching devices of all battery strings are switched together and in the same direction.

In a three-stage 10 kW system, a DC/DC converter is connected by means of a relay controlled in parallel upon switch-off of the pumps for the 2. or 3. stage. The DC/DC converter converts the input voltage of 36 to 72 Volt to an output voltage of 58 Volt and charges the 1. stage of the multi-stage system. Upon switching-on the pumps, this connection is disconnected again by means of the relay. Thus, for example, by disconnecting 8 modules and a charging rate of 80%, approximately 1 kWh of energy can be saved.

Instead of supplying the energy of the shut-down battery string 12b to the still active parallel battery string 12a, an arrangement of accumulators and/or super-capacitors, if necessary in combination with a still active functional unit, can be used as storage. For example, the energy stored in lead-acid batteries could cover the demand during the start-up of yet shut-down functional units until fresh electrolyte is supplied into these stacks, which typically takes approximately one to two minutes. At typical self-discharge rates of 0.1 to 0.32% d−1 in the range between 20° C. and 40° C., for buffering for 8 vanadium flow battery stacks each with 1 kW and rated for maximum values of 60 V and 100 A, for a period of two minutes, four 65 Ah batteries would be required.

Since the self-discharge of the used 12 V lead-acid batteries with 65 Ah is approximately 0.1 to 0.5 W compared to 30 to 120 W of the modules of the flow battery, the loss caused by self-discharge can be reduced to 0.3 to 0.4%.

Preferably, at least in case of an instantaneous energy demand exceeding the capacity of the flow battery, the provided storage is automatically connected again to the load. However, as an alternative, it could also be connected permanently with the load by means of a diode.

The invention claimed is:

1. A redox flow battery which comprises:
   first and second functional units for storing electrical energy,
   a first electrical circuit for connecting said first and second functional units in parallel to a load,
   a first switch means in said first electrical circuit for disconnecting only said first functional unit from the load, and
   a second electrical circuit for electrically connecting said first functional unit with said second functional unit, said second electrical circuit including only a DC/DC converter and second switch means for electrically connecting said first functional unit with said second functional unit when said first functional unit is decoupled from the load and enable electrical discharge of said first functional unit to said second functional unit.

2. The redox flow battery according to claim 1, including third switch means in said first electrical circuit for disconnecting only said second functional unit from the load.

3. The redox flow battery according to claim 1, wherein each of said first and second functional units comprises a battery string.

4. A method for operating a redox flow battery according to claim 1, comprising the steps of operating said first switch means to disconnect said first functional unit from said load, and thereafter operating said second switch means to electrically connect said first functional unit with said second functional unit.

5. The method according to claim 4, comprising the step of again operating said first switch means to connect said first functional unit with said load when an instantaneous energy demand of the load exceeds an energy capacity of the second functional unit.

* * * * *

UNITED STATES PATENT AND TRADEMARK OFFICE
CERTIFICATE OF CORRECTION

PATENT NO.       : 8,568,912 B2                                Page 1 of 1
APPLICATION NO.  : 12/452431
DATED            : October 29, 2013
INVENTOR(S)      : Whitehead et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 765 days.

Signed and Sealed this

Fifteenth Day of September, 2015

Michelle K. Lee
*Director of the United States Patent and Trademark Office*